Nov. 26, 1957 — E. G. CLARK ET AL — 2,814,480
VEHICLE FRONT AXLE SUSPENSION
Filed Jan. 13, 1956 — 2 Sheets-Sheet 1
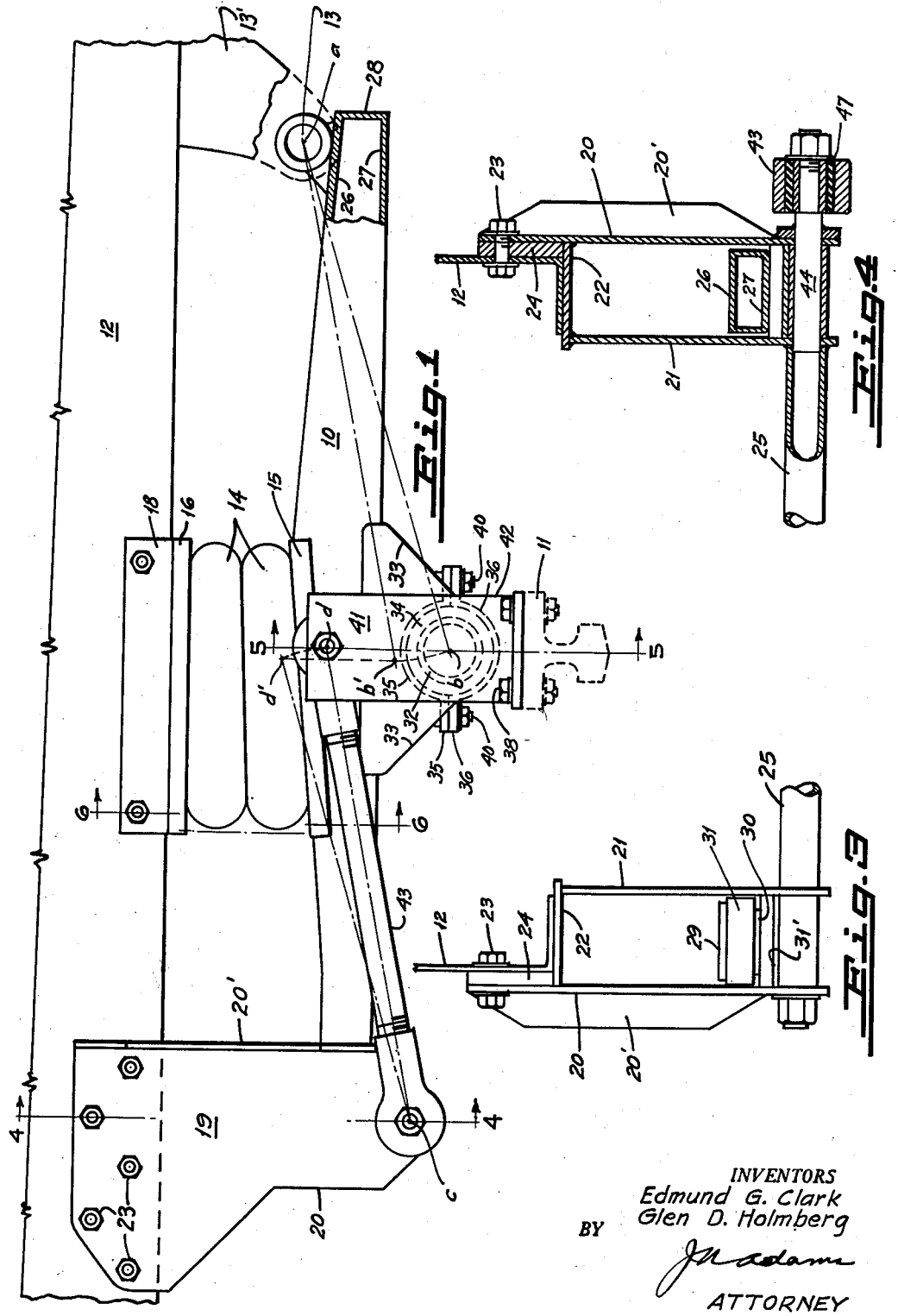
INVENTORS
Edmund G. Clark
Glen D. Holmberg
BY
ATTORNEY Nov. 26, 1957 E. G. CLARK ET AL 2,814,480
VEHICLE FRONT AXLE SUSPENSION
Filed Jan. 13, 1956 2 Sheets-Sheet 2
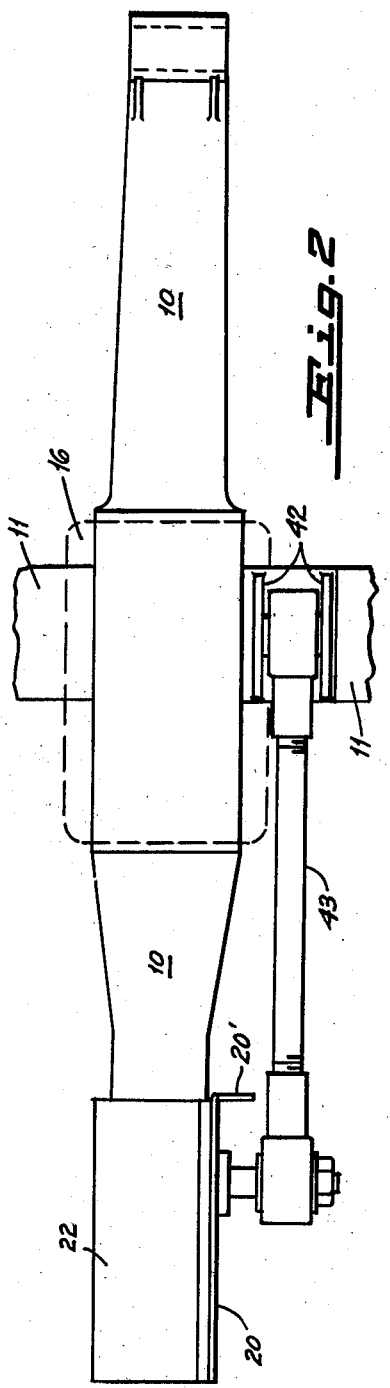
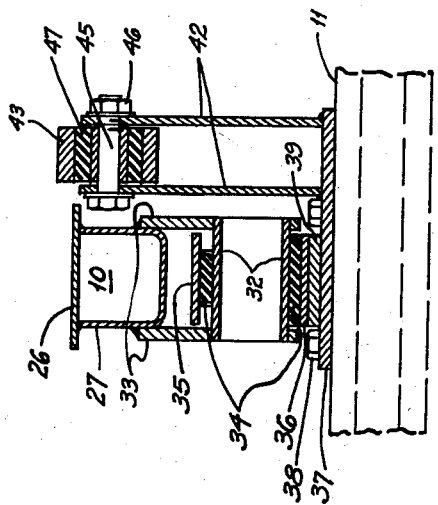
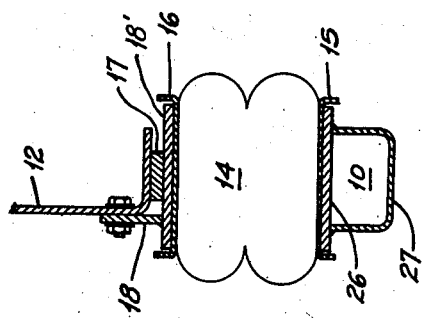
INVENTORS
Edmund G. Clark
Glen D. Holmberg
BY
ATTORNEY United States Patent Office 2,814,480
Patented Nov. 26, 1957

2,814,480

VEHICLE FRONT AXLE SUSPENSION

Edmund G. Clark, Mountain View, and Glen D. Holmberg, Los Altos, Calif., assignors of one-half to Twenty-Five Associates, Inc., a corporation Application January 13, 1956, Serial No. 558,886

4 Claims. (Cl. 267—15)

This invention relates to a vehicle suspension system wherein air bellows, commonly referred to as air springs, are used in lieu of the heretofore conventional leaf type or other form of metal springs.

When air springs are used on vehicles, such as trucks and trailers, the air pressure carried in the bellows is high for heavy loads and low for light loads. It is somewhat analogous to having a metal leaf type spring of many leaves for a heavily loaded vehicle and changing, if that were possible, to one of only a few leaves for a light load. Since it is not feasible to switch from stiff, heavy metal springs for heavily loaded vehicles to lighter springs when the vehicle is less heavily loaded such vehicles are extremely hard riding when lightly loaded. This is especially disadvantageous for the driver's compartments of trucks which are generally located over the front axle. Air-bellows type of springs have come into use with the rear axles of trucks, and on truck trailers, where means are provided for adjusting the air pressure in accordance with the variation in the load carried by the vehicle. Generally the bellows are kept at a constant height for all weights of load carried. In the case of suspensions in connection with the front axle of trucks air springs have not come into such wide use as with rear axles or trailer axles, one reason being that air springs suspensions as heretofore provided for rear axles are not adaptable to the relatively small irregular space available at the front axle and could not be used without interfering with the truck mechanism. For this reason the owners or drivers of trucks have had to forego the easy riding qualities that would be afforded if the use of air springs suspension were available in connection with front axles, and have had to tolerate the hard riding features attending the use of heavy metal springs in front axle suspensions.

It is an object of this invention to provide a vehicle suspension system in which air bellows may be employed in connection with the front axle of trucks and thus make available the easy riding qualities afforded by air bellows in which the "springiness" can be adjusted in accordance with the weight of the load.

In the construction of automotive vehicles primarily because the front wheels must be turned in steering the vehicle, there is given to the front axle a backward cant or inclination of the top of the axle from the vertical, said inclination being called "caster." When one wheel of the front axle passes over a bump or drops into a depression, or in general as the wheels move over uneven terrain, the axle is moved out of its normal alignment and the air bellows at either one or both ends of the axle momentarily become distended or compressed from its normal height. It is another object of this invention to provide an air springs suspension system in which the caster of the front axle is substantially maintained during all driving operations over all terrain.

It is still another object to provide an air spring suspension which can be used with the front axle without permitting lateral shifting of said axle which would interfere with proper steering of the vehicle.

Another object is to provide an air spring suspension which will prevent lateral movement of the chassis frame with respect to the axle as the vehicle goes around a curve in the road. This is a very important feature in a front axle suspension because while the weight carried by the front axle is relatively light as compared with that carried by the rear axle unit the momentum of a heavy load on the rear axle and the resultant centrifugal force developed in rounding a curve on the highway is very high and the front axle suspension must not permit any undue lateral movement of the chassis with respect to said axle.

These and other objects of the invention will be apparent from the ensuing description and the appended claims.

One form of the invention is illustrated by way of example in the accompanying drawings and is described in detail hereinafter. The particular constructions herein shown and described are to be construed as illustrative only, and not as limiting the invention.

In the drawings:

Fig. 1 is a view in side elevation, from the curb side of the vehicle, of our suspension device, Fig. 2 is a top plan view of the device illustrated in Fig. 1, the air bellows springs being shown in dotted line, Fig. 3 is a view in end elevation looking from the rear forwardly, of a bracket structure attached to the underneath side of the chassis frame on the road side (left side) of the vehicle, Fig. 4 is a sectional view on line 4—4 of Fig. 1. It shows a bracket structure on the curb side of the vehicle corresponding to the one shown in Fig. 3 on the left side of the vehicle, Fig. 5 is a sectional view on line 5—5 of Fig. 1, and Fig. 6 is a sectional view on line 6—6 of Fig. 1.

Referring to the drawings, a beam 10, which may be hollow and box-like in cross section as hereinafter explained, positioned above the front axle 11 and below the chassis frame 12, parallel to the longitudinal axis of the vehicle, extends both fore and aft of said axle, one such beam being on each side of the vehicle. Said beam 10 is pivotally mounted at its forward end to swing in a vertical plane about a horizontal pin or shaft 13 suitably mounted in bracket 13' secured to and extending downwardly from the said chassis frame 12. At a point about midway of its length the said beam 10 rests upon a structure later to be described which in turn is carried by the said axle 11. Bearing upon the upper part of said beam at the portion somewhat directly above the said axle 11 is a bellows-like air spring 14 upon which air spring the chassis frame 12 bears. If the truck mechanism will permit, it is preferable that the air springs be centered directly over the said axle. Air springs are generally constructed with a lower plate 15 (best seen in Fig. 6) and an upper plate 16 to which the bellows are vulcanized or otherwise secured, said plates being flanged at their sides downwardly and upwardly, respectively, away from said bellows. Said plate 15 rests upon beam 10 and said plate 16 in turn carries the chassis frame 12, the weight from which is distributed to said plate 16 through the intermediate members 17 and 18 which are welded and bolted respectively to chassis frame member 12 and are welded to plate member 18' which in turn bears upon the said flanged plate 16.

The rearward end of the aforesaid beam 10 is free to move up and down within a bracket structure designated generally as 19 (Fig. 1), which bracket structure will next be described.

The said bracket structure generally designated as 19 in Fig. 1 is seen in sectional view (for the bracket on the curb side of the vehicle) in Fig. 4; whereas, in Fig. 3 it is seen in end view looking forwardly with respect to the vehicle (for the bracket on the road or left side of the vehicle). This bracket structure is made up of an outer vertical side plate 20, provided with a flange 20' for stiffness, an inner vertical side plate 21 and an upper horizontal plate 22 welded to said outer and inner side plates. Outer side plate 20 extends upwardly beyond horizontal plate 22 to permit its being rigidly secured to chassis frame member 12, as by bolts 23 (see also Fig. 1). Filler block 24 is provided between vertical side plate 20 and the chassis frame member 12 and is of sufficient thickness to give desired alignment of said bracket structure for the positioning of the rearward end of beam 10 between said side plates 20 and 21 as hereinafter more fully explained. Pipe 25 extends through appropriate holes in the lower portions of side plates 20 and 21 and is welded or otherwise rigidly secured thereto, said pipe serving, as one of its functions, to assist in giving rigidity to the bracket structure 19.

The said beam 10, which as stated at the ouset of this description may be hollow and box-like in cross section, may be made up of a top plate 26 (Fig. 6) and another plate 27 bent to form the two sides and bottom of said box beam 10, as also seen in Fig. 6, the edges of said plate 27 being welded to said top plate 26. For purposes later to be explained, said hollow beam 10 is provided with a closure member at or near both its forward and rearward ends to provide an air tight closed space within the box-beam. The sectional view at the right hand end of Fig. 1 shows the end closure member 28 at the forward end of hollow beam 10. A similar end closure member is provided near the rearward end of said hollow beam 10, but is not shown in the drawings, it being hidden in Fig. 1 by the side plate 20 of said bracket structure 19. Said rearward end closure member is positioned approximately midway between the front and rear of the lower portion of the bracket structure 19.

At the rearward end of beam 10 the plate members forming the top and the bottom of hollow beam 10 extend rearwardly beyond the end closure member a short distance, say 3 or 4 inches, to form an upper and a lower shelf like projection, 29 and 30 respectively, the rearward ends of which are seen in Fig. 3. Since in Fig. 4 all four walls of box beam 10 formed by plates 26 and 27 are seen, it follows that the end closure member of the rearward end of beam 10, not shown in the drawings, is to the left or rearward of the plane through which line 4—4 of Fig. 1 cuts. The width of beam 10, and correspondingly the widths of said upper and lower shelf-like projecting members 29 and 30 are slightly less than the distance between side plates 20 and 21 to permit of free movement up and down of the end of beam 10 between said side plates. If desired, there may be but one of said shelf-like projecting members 29 and 30, either the upper or lower one. Supported between said members 29 and 30, or by the single such member if there be but one, is a nylon block 31 which fits slidably against side plates 20 and 21 and gives a sliding contact with said side plates without the necessity of lubrication as the beam 10 moves up and down in said bracket structure 19. A block 31' of hard rubber or other suitable material may be secured between the side plates 20 and 21 to serve as an impact or bumper block against which the said nylon block or the shelf member to which said nylon block is secured, as the case may be, may contact in the downward movement of the end of beam 10. The bracket structure 19 is of such depth, and the block 31' is at such position therein, that when the wheel of the vehicle moves into a depression in the terrain, causing beam 10 to rotate downwardly about its pivot 13 and the air bellows 14 to distend, such downward movement of the beam 10 will be stopped by block 31' within the permissible limit of distensibility of the air bellows. Other stopping means may be provided in lieu of block 31'. Pipe 25, for example, may if desired be adapted to serve this function. For operation of the vehicle over smooth, level terrain the normal position of beam 10 is approximately horizontal, with the free or rearward end thereof about midway between where impact with said bumper block 31' takes place and a position the beam occupies when, due to a wheel of the axle 11 passing over an extreme bump in the terrain, the air bellows is compressed to the permissible limit.

Coming now to the structure which is carried by the axle 11 and upon which the beam 10 rests and through which the load on said beam is transmitted to said axle: In the structure shown in the drawings, referring particularly to Fig. 5, a horizontally positioned pipe 32 is rigidly secured to beam 10 by means of vertical plate members 33 (seen in side view in Fig. 1) which are welded to said pipe 32 and to the bent plate 27 of said beam 10. A bushing 34 of hard rubber or other suitable material is fitted around said pipe 32. An upper retainer or cap-like member 35 fits downwardly over the upper portion (approximately the upper half) of said rubber bushing 34, and a lower and opposing, mating retainer member 36, which serves as a bearing member, fits against the lower portion of said rubber bushing. A base plate 37 is secured to the top of axle 11 by bolts 38. An auxiliary base plate 39 may, if desired for conveniently positioning the lower retainer member 36, be rigidly secured, as by welding, to the base plate 37. To this auxiliary base plate 39 the said lower retaining member 36 is welded. Thus the said lower retaining member 36 is rigidly attached to and is in effect integral with the axle 11 of the vehicle. Both the end toward the curb side and the end toward the road- or left-side of both the upper and lower retainer members 35 and 36 are appropriately extended and formed into flange-like parts which seat upon each other, the edges of which are seen in Fig. 1. These are drilled and fitted with bolts 40 (shown in Fig. 1) whereby through the tightening of said bolts the said upper and lower retainer members 35 and 36 compress said rubber bushing 34 about said pipe 32. It will thus be seen that pipe 32 and retainer member 35 and bearing member 36 together with rubber bushing 34 serve in effect as a journaled bearing through which the weight of the loaded chassis borne by the air bellows and in turn by beam 10, is transferred to the axle 11. It will further be seen that when the wheels of axle 11 move over uneven terrain and the air bellows 14 correspondingly deflates and inflates, resulting in an oscillatory movement of beam 10 about its pivotal connection 13 to the chassis, there will be an oscillatory rotary movement of said retaining members 35 and 36, and said rubber bushing 34, about said pipe 32, the pipe serving as a journal about which the bearing structure (members 35 and 36 and bushing 34) turns. If desired, instead of pipe 32 being rigidly attached to beam 10 and retaining members 35 and 36 rigidly attached to axle 11, the reverse construction may be employed, i. e. pipe 32 rigidly secured to axle 11 and retaining members 35 and 36 rigidly secured to beam 10. Other suitable pivotal bearing structures may be employed to transmit the weight from the chassis, through the air bellows, to the axle.

The compressing of the rubber bushing 34 about the pipe or journal member 32 prevents sidewise slippage or lateral movement within the said journal structure. As will be observed in Fig. 5 that portion of the rubber bushing 34 over the upper part of pipe 32 is narrower than the portion below said pipe. This provides a flexibility to the journaled bearing structure which comes into play when the wheel on one end of axle 11 is raised or lowered above or below the wheel on the opposite end of the axle as the truck moves over uneven terrain and causes the axle to be moved out of its normal parallelism with a transverse line across the bottom of the chassis frame.

As the front wheels of the vehicle move over uneven terrain, which may include the two wheels simultaneously encountering either raised or lowered surfaces as well as one wheel encountering either a bump or a depression, the front wheel or wheels tend to swing rearwardly or forwardly from their normal position beneath the chassis. This in turn tends to cause the axle 11 to rotate about the pipe 32, or in other words, to cause rubber bushing 34 held by retainer and bearing members 35 and 36 to rotate about pipe journal 32. Moreover the traction of the front wheel tires upon the road as the vehicle moves over ordinary road surface produces to an extent this same kind of torque effect, and thus to swing the front wheels rearwardly from the normal position given them by the caster—the backward cant or inclination of the top of the front axle from the vertical—which is built into the factory construction of the vehicle. To overcome this torque effect we provide the following structure: An axle bracket or arm, generally designated as 41 (Fig. 1) and made up of two vertical plates 42 (see Fig. 5) welded to base plate 37, extends upwardly from axle 11. By reason of said plate 37 being bolted to said axle, said axle bracket is thus in effect integral with said axle. Torque rod 43 is pivotally mounted at one end to the upper part of said axle bracket 41 between said vertical plates 42 and has its opposite end pivotally mounted to the bracket structure 19 secured as aforesaid to chassis frame 12. Any suitable pivotal mounting means may be provided at each end of said rod 43. In the structure shown in the drawings the pivotal mounting to bracket structure 19 is upon rod 44 (Fig. 4) suitably fitted in the end of pipe 25, while the pivotal mounting to the said axle bracket 41 is upon bolt 45 (Fig. 5) suitably secured to the two upright plates 42, as by nuts 46. Rubber bushings 47 may be provided in the pivotal mounting at each end of rod 43, one use of which being to render unnecessary the use of lubrication in said pivotal joints. The said torque rod 43 is of such length that when the truck is standing on a level surface a line extending through the axis "d" (Fig. 1) of the forward pivotal connection of the rod 43 to axle bracket or arm 41 and through the axis "b" (Fig. 1) of the journaled bearing of pipe 32 within bushing 34 (which latter axis generally coincides with the axis of rotation of the front wheels on axle 11 when the vehicle is on a level surface) has a backward inclination from the vertical equal to the caster given to the front axle in the factory. It will thus be seen that when the vehicle is moving over level terrain the torque rod 43 maintains the caster of the front axle. For those instances when the wheels traverse uneven terrain this caster will be substantially maintained by the torque rod 43. This latter feature will be seen from the dotted lines in Fig. 1. Line "ab," which passes through axis "a" of the pivotal mounting of beam 10 to bracket 13 and through axis "b" of the pivotal mounting of pipe 32 in bushing 34 has, by reason of the rigidity of plates 33 (Fig. 5) to beam 10 and pipe 32, a constant angular relationship to beam 10 during all oscillatory movements of beam 10 about its axis "a" in pin 13. For purposes of this explanation the line "ab" may be termed the effective axis of beam 10. Line "cd" represents the axis of torque rod 43 when the vehicle is on level roadway. When uneven terrain is encountered and, for example, the effective axis of beam 10 moves from the position of "ab" to the position of "ab'" (which corresponds to the maximum permissible compression of air bellows 14), the axis of torque rod 43 moves from the position of "cd" to that of "cd'." The backward inclination from the vertical of a line extending from "b" to "d" when the vehicle is on a level surface is the caster of the front axle. It will be noted that the line "b'd'" is for all practical purposes parallel to the line "bd" (although actually not parallel). In fact the torque rod 43 would have to be rotated about its axis "c" far beyond that permitted by any possible rotation of beam 10 on its axis "a" (far beyond the permissible compression of air bellows 14) before the non-parallelism of line "b'd'" to line "bd" would become substantial. Thus the torque rod 43 maintains to a satisfactory degree the caster of the front axle as the vehicle moves over uneven terrain. Any convenient length of said torque rod, with the centers of its pivotal mountings suitably located so as to preserve to a substantial degree the caster of the front axle, may be employed. In the construction shown in the drawings the torque rod is on the curb side only of the vehicle. If desirable one may also be on the other side of the vehicle.

It is preferable that the upper part of beam 10 be sloped as shown in the drawings (Fig. 1) so that when the vehicle is on level terrain the air bellows will be somewhat wedge shaped. This is preferred so that when the wheel of the vehicle encounters a bump, resulting in compression of the air bellows, the maximum permissible compression will occur when the sloping surface of beam 10 which supports the bellows has reached a horizontal position, thus assuring that at that moment the entire lower surface of the bellows will be equidistant from its upper surface. This minimizes the possibility of injury to the bellows when subjected to maximum compression.

Accompanying the use of air bellows springs on trucks and such vehicles, and connected therewith, is a pressure tank of some kind mounted in the vicinity of the bellows and which carries compressed air. By means of an automatic valve device in the conduit leading from the air pressure tank to the bellows the air pressure within each bellows is kept in adjustment for variations in the weight of the load carried by the vehicle and for impacts upon the bellows as the wheels of the vehicle move over irregularities in the road surface or other terrain. In our invention one or both of the box beams 10, each of which may comprise an air-tight compartment as hereinbefore described, may serve as the pressure tank, sometimes called the surge tank, to carry the compressed air supply for use in such automatic air pressure system for the air bellows, the appropriate conduits, valves, and other appurtenances in connection therewith not being shown in the drawings.

While we have shown a preferred form of our invention, it is to be understood that various changes may be made in its construction without departing from the spirit of the invention as defined in the appended claims.

We claim:

1. In a suspension system for a vehicle in which the chassis of said vehicle is carried on air bellows springs, the combination therewith of a beam extending in a direction lengthwise of said vehicle and on which beam, intermediate its two ends, an air bellows spring is supported, bearing means secured to said beam and associated with said axle by which said beam is mounted, intermediate its two ends, on an axle of said vehicle to bear upon said axle and to turn about a horizontal axis transverse to said beam, one end of said beam being pivotally mounted to said chassis to swing about a horizontal axis also transverse to said beam, the other end of said beam extending a substantial distance beyond the bearing points on said beam of said air bellows spring and said axle and being free to swing upwardly and downwardly when said air bellows spring is compressed and distended, means attached to the said chassis to limit the downward movement of the free end of said beam to that which is in accord with the permissible distensibility of said air bellows spring, vertical guide plates secured to said chassis and positioned in slidable engagement with the edges of the free end of said beam to prevent lateral movement of the free end of said beam, an arm rigidly secured to said axle and extending radially therefrom, and a rod having one end pivotally mounted to said chassis and its other end pivotally mounted to said arm, said rod being of such length and with the centers of its pivotal mountings so located as to maintain the caster of said axle during the operation of said vehicle.

2. A vehicle suspension system in accordance with claim 1, in which said bearing means by which said beam is mounted on said axle is of the journal bearing type, the journal element of which is rigidly secured to one of the members selected from the group consisting of said beam and said axle, and the bearing element which turns in said journal element is rigidly secured to the other of said members.

3. A vehicle suspension system in accordance with claim 2, in which there is positioned between said journal element and said bearing element a resilient bushing in contact with said journal and encircling said journal, a retainer element adapted to serve as a mate to said bearing element positioned against the outer circumferential part of said bushing not contacted by said bearing element, and means coacting with said retainer element and said bearing element to compress said bushing against said journal element.

4. A vehicle suspension system in accordance with claim 3, in which the axial width of said bushing in contact with the upper portion of said journal element is less than the axial width of said bushing in contact with the lower portion of said journal.

References Cited in the file of this patent

UNITED STATES PATENTS

| | | |
|---|---|---|
| 2,039,041 | Wall | Apr. 28, 1936 |
| 2,179,016 | Leighton | Nov. 7, 1939 |
| 2,208,538 | Brown | July 16, 1940 |
| 2,300,844 | Olley | Nov. 3, 1942 |
| 2,367,817 | Brown | Jan. 23, 1945 |

FOREIGN PATENTS

| | | |
|---|---|---|
| 300,856 | Great Britain | Nov. 22, 1928 |
| 428,664 | Great Britain | May 16, 1935 |
| 540,192 | Great Britain | Oct. 8, 1941 |